(12) United States Patent
Lee et al.

(10) Patent No.: US 9,699,710 B2
(45) Date of Patent: Jul. 4, 2017

(54) METHOD AND APPARATUS FOR RECEIVING SYSTEM INFORMATION IN WIRELESS COMMUNICATION SYSTEM

(71) Applicant: LG ELECTRONICS INC., Seoul (KR)

(72) Inventors: Youngdae Lee, Anyang-si (KR); Sungjun Park, Anyang-si (KR); Seungjune Yi, Anyang-si (KR); Sunghoon Jung, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/403,952

(22) PCT Filed: Jun. 7, 2013

(86) PCT No.: PCT/KR2013/005043
§ 371 (c)(1),
(2) Date: Nov. 25, 2014

(87) PCT Pub. No.: WO2013/183966
PCT Pub. Date: Dec. 12, 2013

(65) Prior Publication Data
US 2015/0327155 A1    Nov. 12, 2015

Related U.S. Application Data

(60) Provisional application No. 61/657,041, filed on Jun. 8, 2012.

(51) Int. Cl.
*H04W 48/12*    (2009.01)
*H04W 74/00*    (2009.01)
(Continued)

(52) U.S. Cl.
CPC .......... *H04W 48/12* (2013.01); *H04W 4/005* (2013.01); *H04W 74/006* (2013.01); *H04W 76/023* (2013.01)

(58) Field of Classification Search
None
See application file for complete search history.

(56) References Cited

U.S. PATENT DOCUMENTS

2006/0252377 A1    11/2006    Jeong et al.
2009/0181661 A1    7/2009    Kitazoe et al.
(Continued)

FOREIGN PATENT DOCUMENTS

EP    2068596 A2    6/2009

*Primary Examiner* — Diane Lo
(74) *Attorney, Agent, or Firm* — Birch, Stewart, Kolasch & Birch, LLP

(57) ABSTRACT

A method and user equipment (UE) are provided for receiving system information in a wireless communication system. The UE receives, from a base station, a master information block (MIB) indicating that the base station broadcasts a first system information block type 1 (SIB1) for a specific type of UE. The UE receives the first SIB1 for the specific type of UE when the MIB indicates that the base station broadcasts the first SIB1 for the specific type of UE, and receives a first set of at least one system information block (SIB) from the base station based on the first SIB1. The first set of at least one SIB is scheduled within a first bandwidth that is smaller than a second bandwidth for a second set of at least one SIB.

13 Claims, 7 Drawing Sheets

(51) Int. Cl.
*H04W 4/00* (2009.01)
*H04W 76/02* (2009.01)

(56) References Cited

U.S. PATENT DOCUMENTS

| | | | |
|---|---|---|---|
| 2011/0149827 A1 | 6/2011 | Na et al. | |
| 2011/0310731 A1* | 12/2011 | Park | H04W 28/18 370/230 |
| 2012/0113843 A1* | 5/2012 | Watfa | H04W 72/1289 370/252 |
| 2012/0327895 A1* | 12/2012 | Wallen | H04W 48/12 370/330 |
| 2013/0083753 A1* | 4/2013 | Lee | H04W 72/0453 370/329 |
| 2013/0136098 A1* | 5/2013 | Li | H04W 72/042 370/330 |
| 2013/0301552 A1* | 11/2013 | Xu | H04W 4/005 370/329 |
| 2013/0303240 A1* | 11/2013 | Sanka | H04B 1/3816 455/558 |

* cited by examiner

METHOD AND APPARATUS FOR RECEIVING SYSTEM INFORMATION IN WIRELESS COMMUNICATION SYSTEM

CROSS REFERENCE TO RELATED APPLICATIONS

This application is the National Phase of PCT/KR2013/005043 filed on Jun. 7, 2013, which claims priority under 35 U.S.C. 119(e) to U.S. Provisional Application No. 61/657,041 filed on Jun. 8, 2012, all of which are incorporated by reference herein in its entirety.

TECHNICAL FIELD

The present invention relates to wireless communications, and more particularly, to a method and apparatus for receiving system information in a wireless communication system.

BACKGROUND ART

Universal mobile telecommunications system (UMTS) is a 3rd generation (3G) asynchronous mobile communication system operating in wideband code division multiple access (WCDMA) based on European systems, global system for mobile communications (GSM) and general packet radio services (GPRS). A long-term evolution (LTE) of UMTS is under discussion by the 3rd generation partnership project (3GPP) that standardized UMTS.

3GPP LTE may introduce a machine type communication (MTC). The MTC is a form of data communication which involves one or more entities that do not necessarily need human interaction. A service optimized for the MTC differs from a service optimized for human to human (H2H) communications. The MTC is different to current mobile network communication services as it involves:
- different market scenarios,
- data communications,
- lower costs and effort,
- a potentially very large number of communicating terminals with,
- to a large extent, little traffic per terminal.

MTC is an important revenue stream for operators and has a huge potential from the operator perspective. There are several industry forums working on an efficient M2M system with some industry members developing a new access technology dedicated for MTC. However, it is more efficient for operators to be able to serve MTC user equipments (UEs) using already deployed radio access technology. Therefore, it is important for operators to understand whether 3GPP LTE could be a competitive radio access technology for efficient support of MTC. It is envisaged that MTC UEs will be deployed in huge numbers, large enough to create an eco-system on its own. Lowering the cost of MTC UEs is an important enabler for implementation of the concept of "internet of things". MTC UEs used for many applications will require low operational power consumption and are expected to communicate with infrequent small burst transmissions.

Meanwhile, in 3GPP LTE, a cell bandwidth can be scalable. A LTE cell supports one of 1.4 MHz, 3 MHz, 5 MHz, 10 MHz, 15 MHz and 20 MHz. If a UE supports 3GPP LTE, the UE should support at least 20 MHz cell bandwidth. The UE can work with any cell bandwidth. But, all LTE UEs should work in a cell of 20 MHz bandwidth. Namely, 20 MHz is the minimum UE capability that the LTE UEs should support.

Normally, an MTC device is considered as low cost device on the market. The fact that an LTE UE should support at least 20 MHz could increase cost of an MTC device supporting 3GPP LTE. Thus, it is considered that if an LTE UE operates as an MTC device, this type of LTE UE can reduce supported cell bandwidth. For instance, this type of UE may support only 1.4 MHz, 3 MHz, or 5 MHz bandwidth.

System information is necessary information which must be known to a UE to access a network. The UE must entirely receive the system information before the network access, and must always have the latest system information. In addition, since the system information is information which must be known to all UEs in one cell, the BS may periodically transmit the system information.

A method for receiving system information, when a UE is a specific type of UE, e.g. an MTC device, is required.

SUMMARY OF INVENTION

Technical Problem

The present invention provides a method and apparatus for receiving system information in a wireless communication system. The present invention provides a method for receiving, by a user equipment (UE), a specific set of system information for a specific type of UE when the UE is the specific type of UE.

Solution to Problem

In an aspect, a method of receiving, by a user equipment (UE), system information in a wireless communication system is provided. The method includes receiving, from a base station, a master information block (MIB) indicating that the base station broadcasts both a first set of at least one system information block (SIB), and a second set of at least one SIB, and receiving the second set of at least one SIB from the base station if the UE is a specific type of UE.

The first set of at least one system information block may be scheduled within a first bandwidth, the second set of at least one system information block may be scheduled within a second bandwidth, and the second bandwidth may be smaller bandwidth than the first bandwidth.

The UE may support the second bandwidth, but may not support the first bandwidth.

The first set of at least one system information block may include at least one of a system information block type 1 (SIB1) through a SIB15.

The second set of at least one system information block may correspond to machine type communication (MTC) devices.

The second set of at least one system information block may correspond to device-to-device (D2D) communication.

Receiving the second set of at least one system information block may include monitoring a physical downlink control channel (PDCCH) including a system information radio network temporary identifier (SI-RNTI) for scheduling of the second set of at least one system information block, receiving a first SIB, among the second set of at least one system information block, including scheduling information of the remaining system information blocks of the second set of at least one system information block, and receiving the remaining system information blocks of the second set of at least one system information block.

The SI-RNTI for scheduling of the second set of at least one system information block may indicate whether the second set of at least one system information block is scheduled on a downlink shared channel (DL-SCH).

The method may further include receiving a paging message indicating change of the second set of at least one system information block.

The paging message may be for the specific type of UE.

The paging message may be received on paging occasions for the specific type of UE.

The paging occasions for the specific type of UE may be received via the second set of at least one system information block.

The paging occasions for the specific type of UE may be a subset of paging occasions of normal UEs.

The method may further include monitoring a PDCCH including a paging RNTI (P-RNTI) for the specific type of UE.

In another aspect, a user equipment (UE) in a wireless communication system is provided. The UE includes a radio frequency (RF) unit for transmitting or receiving a radio signal, and a processor coupled to the RF unit, and configured for receiving, from a base station, an MIB indicating that the base station broadcasts both a first set of at least one SIB, and a second set of at least one SIB, and receiving the second set of at least one SIB from the base station if the UE is a specific type of UE.

Advantageous Effects of Invention

A UE, which is a specific type of UE, can receive system information for the specific type of UE.

MODE FOR THE INVENTION

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802.20, evolved UTRA (E-UTRA), etc. IEEE 802.16m is evolved from IEEE 802.16e, and provides backward compatibility with a system based on the IEEE 802.16e. The UTRA is a part of a universal mobile telecommunication system (UMTS). 3$^{rd}$ generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

For clarity, the following description will focus on LTE-A. However, technical features of the present invention are not limited thereto.

Figure 1:
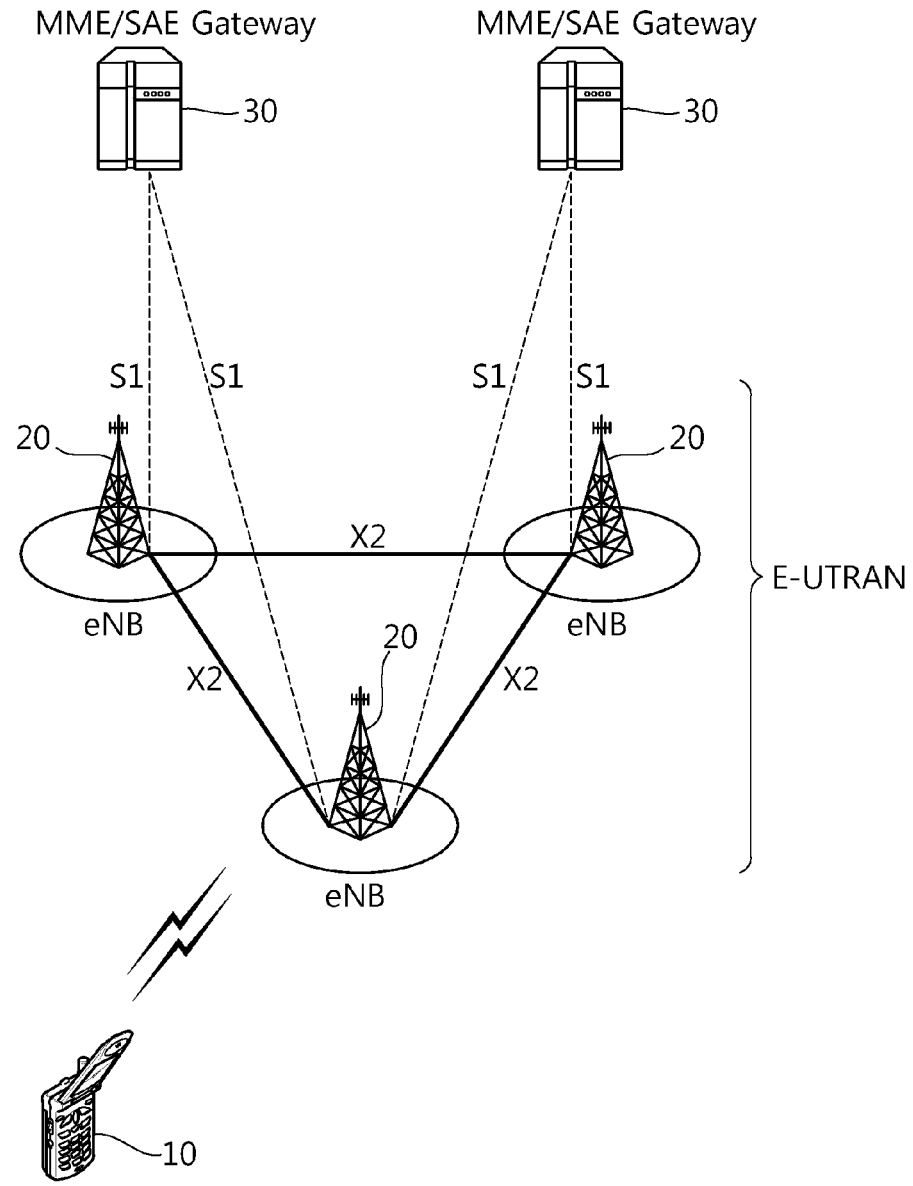
FIG. 1 shows a structure of a wireless communication system.

FIG. 1 shows a structure of a wireless communication system.

The structure of FIG. 1 is an example of a network structure of an evolved-UMTS terrestrial radio access network (E-UTRAN). An E-UTRAN system may be a 3GPP LTE/LTE-A system. An evolved-UMTS terrestrial radio access network (E-UTRAN) includes a user equipment (UE) 10 and a base station (BS) 20 which provides a control plane and a user plane to the UE. The user equipment (UE) 10 may be fixed or mobile, and may be referred to as another terminology, such as a mobile station (MS), a user terminal (UT), a subscriber station (SS), a wireless device, etc. The BS 20 is generally a fixed station that communicates with the UE 10 and may be referred to as another terminology, such as an evolved node-B (eNB), a base transceiver system (BTS), an access point, etc. There are one or more cells within the coverage of the BS 20. A single cell is configured to have one of bandwidths selected from 1.25, 2.5, 5, 10, and 20 MHz, etc., and provides downlink or uplink transmission services to several UEs. In this case, different cells can be configured to provide different bandwidths.

Interfaces for transmitting user traffic or control traffic may be used between the BSs 20. The BSs 20 are interconnected by means of an X2 interface. The BSs 20 are connected to an evolved packet core (EPC) by means of an S1 interface. The EPC may consist of a mobility management entity (MME) 30, a serving gateway (S-GW), and a packet data network (PDN) gateway (PDN-GW). The MME has UE access information or UE capability information, and such information may be primarily used in UE mobility management. The S-GW is a gateway of which an endpoint is an E-UTRAN. The PDN-GW is a gateway of which an endpoint is a PDN. The BSs 20 are connected to the MME 30 by means of an S1-MME, and are connected to the S-GW by means of S1-U. The S1 interface supports a many-to-many relation between the BS 20 and the MME/S-GW 30.

Hereinafter, a downlink (DL) denotes communication from the BS 20 to the UE 10, and an uplink (UL) denotes communication from the UE 10 to the BS 20. In the DL, a transmitter may be a part of the BS 20, and a receiver may be a part of the UE 10. In the UL, the transmitter may be a part of the UE 10, and the receiver may be a part of the BS 20.

Figure 2:
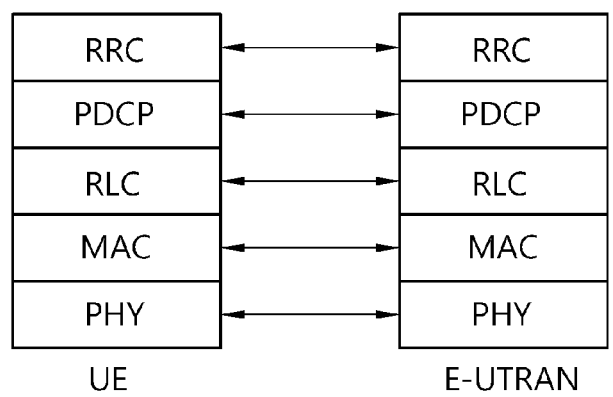
FIG. 2 is a diagram showing a radio interface protocol architecture for a control plane.
Figure 3:
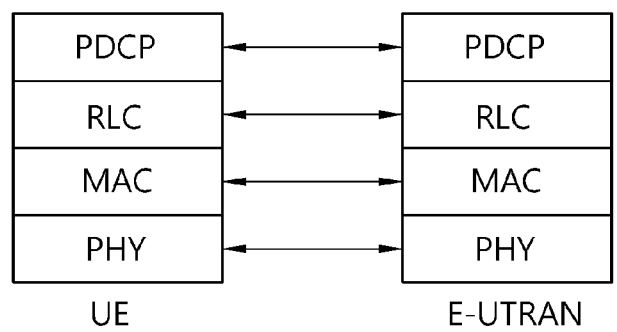
FIG. 3 is a diagram showing a radio interface protocol architecture for a user plane.

FIG. 2 is a diagram showing a radio interface protocol architecture for a control plane. FIG. 3 is a diagram showing a radio interface protocol architecture for a user plane.

Layers of a radio interface protocol between the UE and the E-UTRAN can be classified into a first layer (L1), a second layer (L2), and a third layer (L3) based on the lower three layers of the open system interconnection (OSI) model that is well-known in the communication system. The radio interface protocol between the UE and the E-UTRAN can be horizontally divided into a physical layer, a data link layer, and a network layer, and can be vertically divided into a control plane which is a protocol stack for control signal transmission and a user plane which is a protocol stack for data information transmission. The layers of the radio interface protocol exist in pairs at the UE and the E-UTRAN.

A physical (PHY) layer belonging to the L1 provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transmitted through a radio interface. Between different PHY layers, i.e., a PHY layer of a transmitter and a PHY layer of a receiver, data is transferred through the physical channel. The physical channel is modulated using an orthogonal frequency division multiplexing (OFDM) scheme, and utilizes time and frequency as a radio resource.

The PHY layer uses several physical control channels. A physical downlink control channel (PDCCH) reports to a UE about resource allocation of a paging channel (PCH) and a downlink shared channel (DL-SCH), and hybrid automatic repeat request (HARQ) information related to the DL-SCH. The PDCCH can carry a UL grant for reporting to the UE about resource allocation of UL transmission. A physical control format indicator channel (PCFICH) reports the number of OFDM symbols used for PDCCHs to the UE, and is transmitted in every subframe. A physical hybrid ARQ indicator channel (PHICH) carries an HARQ ACK/NACK signal in response to UL transmission. A physical uplink control channel (PUCCH) carries UL control information such as HARQ ACK/NACK for DL transmission, scheduling request, and CQI. A physical uplink shared channel (PUSCH) carries a UL-uplink shared channel (SCH).

Figure 4:
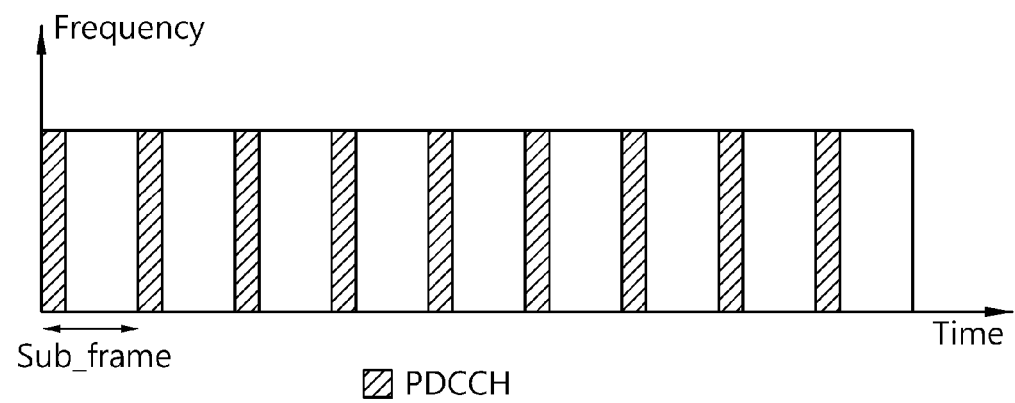
FIG. 4 shows an example of a physical channel structure.

FIG. 4 shows an example of a physical channel structure.

A physical channel consists of a plurality of subframes in a time domain and a plurality of subcarriers in a frequency domain. One subframe consists of a plurality of symbols in the time domain. One subframe consists of a plurality of resource blocks (RBs). One RB consists of a plurality of symbols and a plurality of subcarriers. In addition, each subframe can use specific subcarriers of specific symbols of a corresponding subframe for a PDCCH. For example, a first symbol of the subframe can be used for the PDCCH. A transmission time interval (TTI) which is a unit time for data transmission may be equal to a length of one subframe.

A DL transport channel for transmitting data from the network to the UE includes a broadcast channel (BCH) for transmitting system information, a paging channel (PCH) for transmitting a paging message, a DL-SCH for transmitting user traffic or control signals, etc. The system information carries one or more system information blocks. All system information blocks can be transmitted with the same periodicity. Traffic or control signals of a multimedia broadcast/multicast service (MBMS) are transmitted through a multicast channel (MCH). Meanwhile, a UL transport channel for transmitting data from the UE to the network includes a random access channel (RACH) for transmitting an initial control message, a UL-SCH for transmitting user traffic or control signals, etc.

A MAC layer belonging to the L2 provides a service to a higher layer, i.e., a radio link control (RLC), through a logical channel. A function of the MAC layer includes mapping between the logical channel and the transport channel and multiplexing/de-multiplexing for a transport block provided to a physical channel on a transport channel of a MAC service data unit (SDU) belonging to the logical channel. The logical channel is located above the transport channel, and is mapped to the transport channel. The logical channel can be divided into a control channel for delivering control region information and a traffic channel for delivering user region information. The logical includes a broadcast control channel (BCCH), a paging control channel (PCCH), a common control channel (CCCH), a multicast control channel (MCCH), a multicast traffic channel (MTCH), etc.

An RLC layer belonging to the L2 supports reliable data transmission. A function of the RLC layer includes RLC SDU concatenation, segmentation, and reassembly. To ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides error correction by using an automatic repeat request (ARQ). Meanwhile, a function of the RLC layer can be implemented with a functional block inside the MAC layer. In this case, the RLC layer may not exist.

A packet data convergence protocol (PDCP) layer belongs to the L2. A function of a packet data convergence protocol (PDCP) layer in the user plane includes user data delivery, header compression, and ciphering. The header compression has a function for decreasing a size of an IP packet header which contains relatively large-sized and unnecessary control information, to support effective transmission in a radio section having a narrow bandwidth. A function of a PDCP layer in the control plane includes control-plane data delivery and ciphering/integrity protection.

A radio resource control (RRC) layer belonging to the L3 is defined only in the control plane. The RRC layer takes a role of controlling a radio resource between the UE and the network. For this, the UE and the network exchange an RRC message through the RRC layer. The RRC layer serves to control the logical channel, the transport channel, and the physical channel in association with configuration, reconfiguration, and release of RBs. An RB is a logical path provided by the L2 for data delivery between the UE and the network. The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

Figure 5:
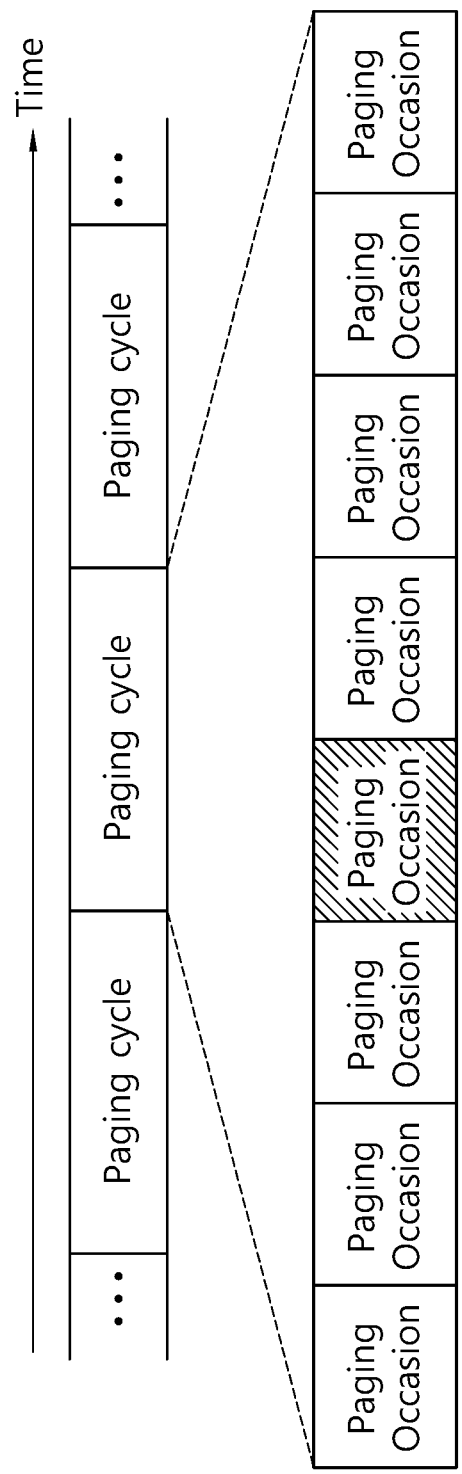
FIG. 5 shows transmission of a paging channel.

FIG. 5 shows transmission of a paging channel.

When there is data to be transmitted by a network to a specific UE or a call delivered to the specific UE, the paging message is used to search and wake up the UE. To transmit the paging message, an E-UTRAN may search for a certain location area in which the UE is currently located, and may transmit the paging message through one cell belonging to the location area in which the UE is located. For this, whenever there is a change in the location area, the UE may report the change to the network, which is called a location area update procedure.

Referring to FIG. 5, a plurality of paging cycles is configured, and one paging cycle may include a plurality of paging occasions. When receiving the paging message, the UE may perform discontinuous reception (DRX) to decrease power consumption. For this, the network may configure a plurality of paging occasions for every time period called a paging cycle, and a specific UE may receive the paging message by monitoring a paging channel only during a specific paging occasion. The UE does not monitor the paging channel in a time other than the specific paging occasion assigned to the UE. One paging occasion may correspond to one TTI.

System information is described below. It may be referred to Section 5.2 of 3GPP TS 36.331 V11.0.0 (2012-06).

System information is divided into a MasterInformationBlock (MIB) and a number of SystemInformationBlocks (SIBs). The MIB defines the most essential physical layer information of a cell required to receive further system information. SystemInformationBlockType1 contains information relevant when evaluating if a UE is allowed to access a cell and defines scheduling of other SIBs. Other SIBs are sets of related system information. For example, a specific SIB may include only information of a neighbor cell, and another SIB may include only information of an uplink radio channel used by the UE.

The MIB is mapped on a BCCH and carried on a BCH while all SIBs are mapped on the BCCH and dynamically carried on a DL-SCH where they can be identified through an SI-RNTI (system information radio network temporary identifier). The MIB uses a fixed schedule with a periodicity of 40 ms and repetitions made within 40 ms. The first transmission of the MIB is scheduled in subframe #0 of radio frames for which the SFN mod 4=0, and repetitions are scheduled in subframe #0 of all other radio frames.

The SystemInformationBlockType1 uses a fixed schedule with a periodicity of 80 ms and repetitions made within 80 ms. The first transmission of the SystemInformation-BlockType1 is scheduled in subframe #5 of radio frames for which the SFN mod 8=0, and repetitions are scheduled in subframe #5 of all other radio frames for which SFN mod 2=0. A single SI-RNTI is used to address the SystemInformationBlockType1 as well as all other SIBs. The SystemInformationBlockType1 configures an SI-window length and the transmission periodicity for all other SIBs.

Scheduling of all other SIBs is flexible and indicated by the SystemInformation-BlockType1. The SIBs are transmitted within periodically occurring SI-windows using dynamic scheduling. Each SIB is associated with a SI-window, and SI-windows of different SIBs do not overlap. That is, within one SI-window only the corresponding SIB is transmitted. The length of the SI-window is common for all SIBs, and is configurable. Within the SI-window, the corresponding SIB can be transmitted a number of times in any subframe other than Multicast-Broadcast Single Frequency Network (MBSFN) subframes, uplink subframes in time domain duplex (TDD), and subframe #5 of radio frames for which SFN mod 2=0. The UE acquires the detailed time-domain scheduling (and other rmation, e.g. frequency-domain scheduling, used transport format) from decoding an SI-RNTI on a PDCCH.

The eNB may schedule DL-SCH transmissions concerning logical channels other than BCCH in the same subframe as used for the BCCH. The minimum UE capability restricts the BCCH mapped to DL-SCH e.g. regarding the maximum rate. System information may also be provided to the UE by means of dedicated signaling e.g. upon handover.

Change of system rmation only occurs at specific radio frames, i.e. concept of a modification period is used. System rmation may be transmitted a number of times with the same content within a modification period, as defined by its scheduling. The modification period boundaries are defined by SFN values for which SFN mod m=0, where m is the number of radio frames comprising the modification period. The modification period is configured by system rmation.

Figure 6:
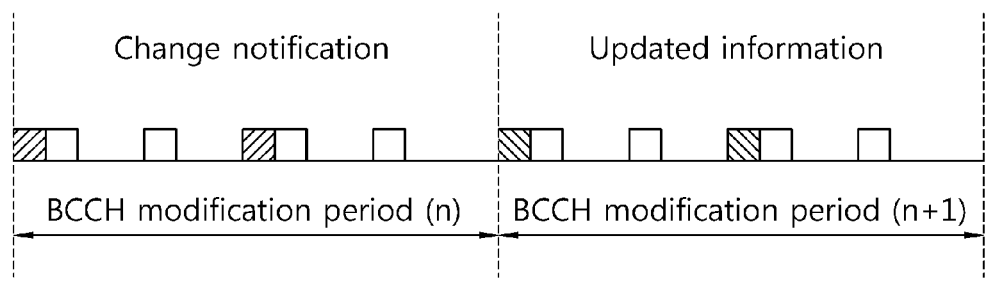
FIG. 6 shows a change of change of system information.

FIG. 6 shows a change of change of system information.

When a network changes (some of the) system rmation, it first notifies UEs about this change, i.e. this may be done throughout a modification period. In the next modification period, the network transmits updated system rmation. Referring to FIG. 6, different hatchings indicate different system rmation. Upon receiving a change notification, the UE acquires new system rmation immediately from the start of the next modification period. The UE applies the previously acquired system rmation until the UE acquires the new system rmation.

A paging message is used to rm UEs in RRC idle state (RRC_IDLE) and UEs in RRC connected state (RRC_CONNECTED) about a system rmation change. If the UE receives a paging message including systemInfoModification, it knows that the system rmation will change at the next modification period boundary. Although the UE may be rmed about changes in the system rmation, no further details are provided e.g. regarding which system rmation will change.

The SystemInformationBlockType1 includes a value tag, systemInfoValueTag, that indicates if a change has occurred in the system information. The UE may use systemInfoValueTag, e.g. upon return from out of coverage, to verify if the previously stored system information is still valid. Additionally, the UE considers the stored system rmation to be invalid after 3 hours from the moment it was successfully confirmed as valid, unless specified otherwise.

The UE verifies that the stored system rmation remains valid by either checking systemInfoValueTag in the SystemInformationBlockType1 after the modification period boundary, or attempting to find systemInfoModification indication at least modification-PeriodCoeff times during the modification period in case no paging message is received, in every modification period. If no paging message is received by the UE during a modification period, the UE may assume that no change of the system rmation will occur at the next modification period boundary. If the UE in RRC_CONNECTED, during the modification period, receives one paging message, it may deduce from the presence/absence of systemInfoModification whether a change of the system rmation will occur in the next modification period or not.

Figure 7:
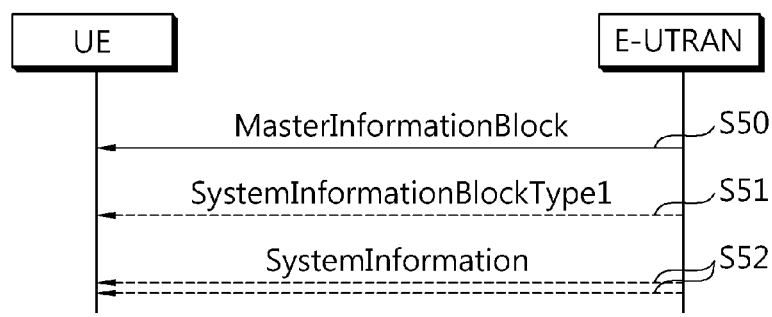
FIG. 7 shows a system information acquisition procedure.

FIG. 7 shows a system information acquisition procedure.

A UE applies a system rmation acquisition procedure to acquire an access stratum (AS)- and non-access stratum (NAS)-system rmation that is broadcasted by an E-UTRAN. The system rmation acquisition procedure applies to UEs in RRC_IDLE and UEs in RRC_CONNECTED.

Referring to FIG. 7, At step S50, a UE receives a MIB from an E-UTRAN. At step S51, the UE receives a SystemInformationBlockType1 from the E-UTRAN. At step S52, the UE receives system information from the E-UTRAN.

Generally, an MIB may be transmitted using relatively narrow bandwidth while all other SIBs may be transmitted using relatively wide bandwidth. For example, an MIB may be transmitted through 3 MHz bandwidth among 20 MHz bandwidth of a cell, while all other SIBs may be transmitted through whole 20 MHz of the cell.

In case that a machine type communication (MTC) device supporting 3GPP LTE reduces supported bandwidth, e.g. a certain bandwidth less than 20 MHz, an MTC device may fail to receive all system information at normal LTE cells, other than an MIB. It is because the normal LTE cells are allowed to schedule SIBs within 20 MHz. For instance, if MTC devices supports only up to 3 MHz cell bandwidth, the MTC devices could not acquire system information scheduled out of 3 MHz. Therefore, system information for narrow bandwidth other than normal system information may be required.

Or, if a UE is a specific type of UE, system information for the specific type of UE may be required. For example, system information for low cost UEs other than normal system information may be required.

Therefore, a method for providing a specific set of system information for a specific type of UE, other than normal set of system information, may be proposed according to embodiments of the present invention.

Figure 8:
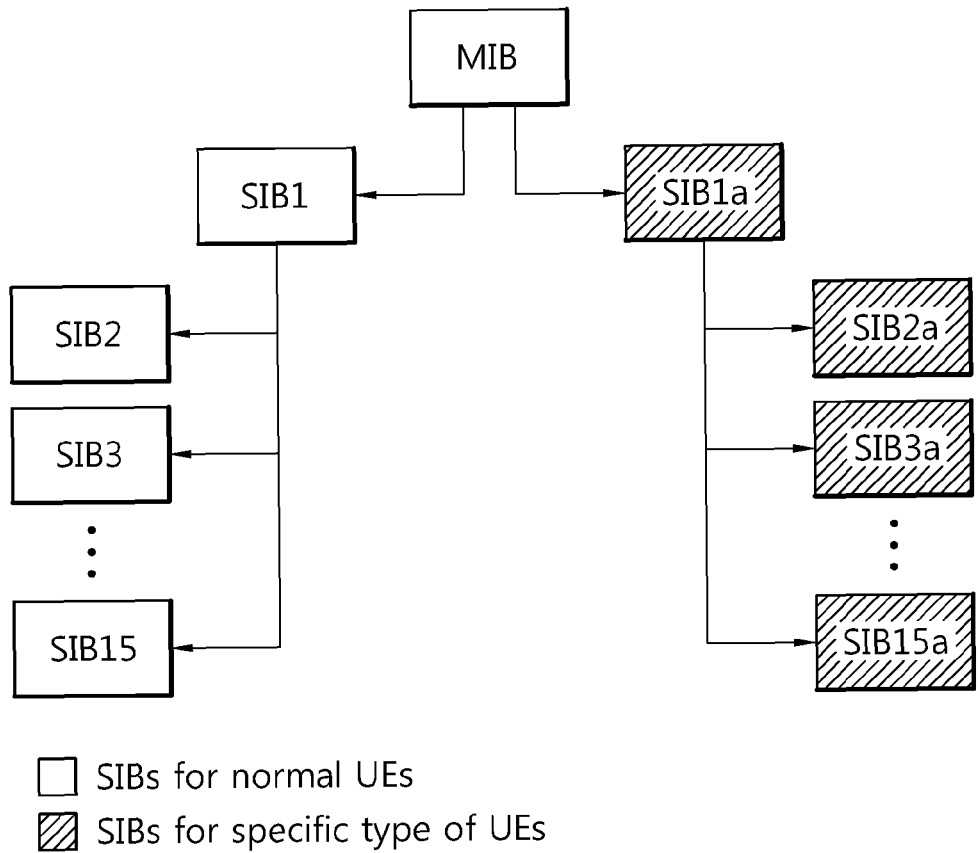
FIG. 8 shows a structure of a set of system information for normal UEs and a set of system information for a specific type of UEs according to an embodiment of the present invention.

FIG. 8 shows a structure of a set of system information for normal UEs and a set of system information for a specific type of UEs according to an embodiment of the present invention.

Referring to FIG. 8, white blocks indicates a set of system information for normal UEs. That is, the white blocks correspond to system information blocks that exist from 3GPP LTE and are used for all UEs except a specific type of UEs. Gray blocks indicate a set of system information for a specific type of UEs. That is, the gray blocks correspond to system information blocks that are newly introduced for the specific type of UEs. The specific type of UEs may be MTC devices that do not support all or some of minimum UE capabilities specified in 3GPP LTE. Or, the specific type of UEs may be lost cost UEs. Hereinafter, the system information blocks for the specific type of UEs, which correspond to the gray blocks of FIG. 8, are called MTC SIBs for convenience. However, the MTC SIBs may be replaceable with other names like "second set of SIBs" or "low cost SIBs", etc.

There may be one to one correspondence between a normal SIB and an MTC SIB.

For instance, SIB1a for a specific type of UEs corresponds to SIB1 for normal UEs. SIB2a for a specific type of UEs corresponds to SIB2 for normal UEs, SIB3a for a specific type of UEs corresponds to SIB3 for normal UEs, and so on. It may be possible that contents included in multiple normal SIBs may be included within a single MTC SIB.

The MTC SIBs may be carried on BCCH/BCH/PBCH that is different than BCCH/BCH/PBCH carrying the normal SIBs. The MTC SIBs may be repeated according to a BCCH repetition period and may be changed according to a BCCH modification period. Some of MTC SIBs may be changed immediately after indication in a paging message. A BCCH repetition period and modification period applied to the MTC SIBs may be different than a BCCH repetition period and modification period applied to normal SIBs.

Figure 9:
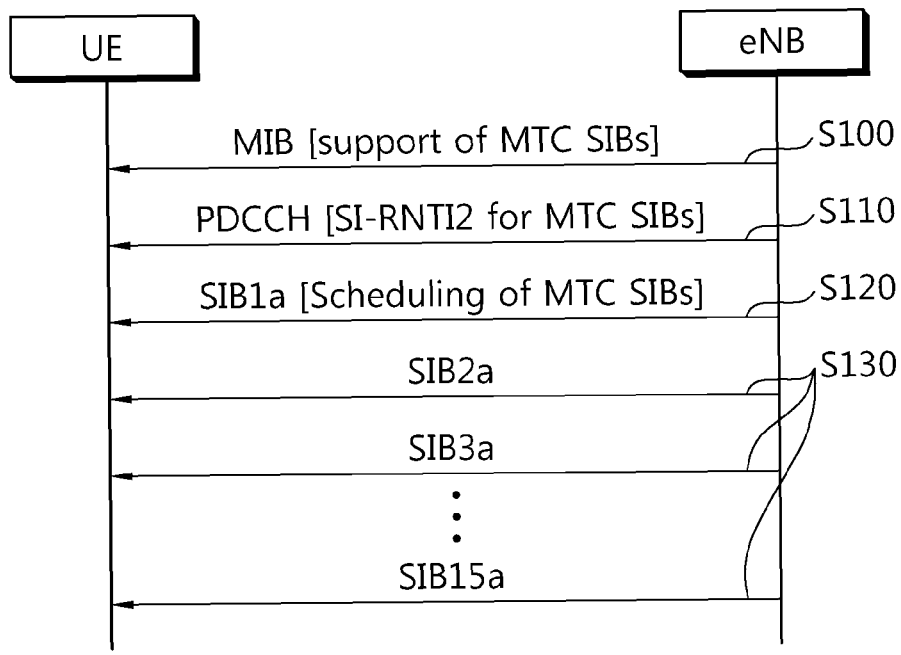
FIG. 9 shows an example of acquisition of MTC SIBs according to an embodiment of the present invention.

FIG. 9 shows an example of acquisition of MTC SIBs according to an embodiment of the present invention.

At step S100, a UE receives a MIB. It is assumed that an eNB broadcasts the MIB and MTC SIBs as well as normal SIBs. The MIB may indicate whether or not the MTC SIBs are scheduled at a cell. If UE is a specific type of UE, and if the MIB indicates that the MTC SIBs are supported, the UE considers that the cell broadcasts the MTC SIBs.

At step S110, the UE monitors a PDCCH. When the eNB schedules the MTC SIBs on a DL-SCH at the cell, the eNB indicates an SI-RNTI2, which is for scheduling of the MTC SIBs, on the PDCCH to inform the UE about dynamic scheduling of the MTC SIBs on the DL-SCH.

At step S120, the UE receives an SIB1a. If the cell broadcasts the MTC SIBs, and if the UE is a specific type of UE, the UE may monitor subframes that can broadcast SIB1a. When the PDCCH in a subframe indicates the SI-RNTI2 for scheduling of the MTC SIBs, the UE may consider that the MTC SIBs are scheduled in the subframe. The UE may acquire scheduling information about how other MTC SIBs are scheduled at the cell by receiving the SIB1a.

At step S130, the UE receives other MTC SIBS. The UE may monitor subframes where the other MTC SIBs are scheduled based on the SIB1a. When the PDCCH in the subframe indicates the SI-RNTI2 for scheduling of the MTC SIBs, the UE may consider that the MTC SIBs are scheduled in the subframe. The UE may receive one or more MTC SIBs such as SIB2a and SIB3a.

The eNB may broadcast a first MTC SIB for RRC_IDLE and a second MTC SIB for RRC_CONNECTED. In this case, if the UE is in RRC_IDLE, the UE may receive the first MTC SIB. If the UE is in RRC_CONNECTED, the UE may receive the second MTC SIB.

Figure 10:
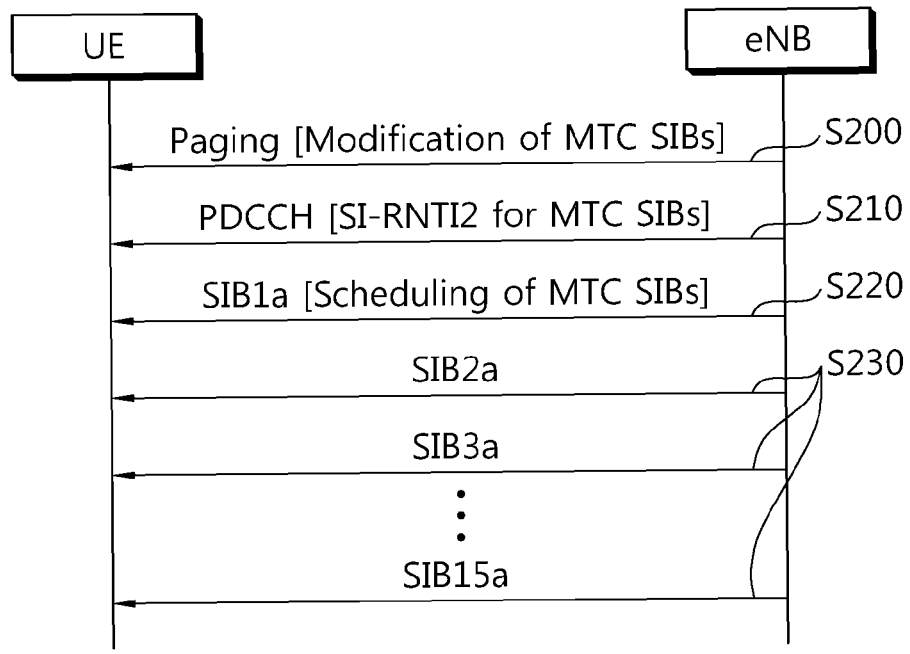
FIG. 10 shows an example of indication of change of MTC SIBs according to an embodiment of the present invention.

FIG. 10 shows an example of indication of change of MTC SIBs according to an embodiment of the present invention.

At step S200, a UE receives a paging message for a specific type of UE. After entering a cell, if the UE is a specific type of UE, the UE keeps monitoring MTC SIBs by using the paging message. One of MTC SIBs informs the UE about paging configuration that is only for the specific type of UE.

The paging message for the specific type of UE may be scheduled for the specific type of UE. For example, if the specific type of UE is a low cost UE, the paging message may be scheduled only within a smaller bandwidth than 20 MHz. The paging message for the specific type of UE may be different than a normal paging message. The paging message for the specific type of UE may be transmitted on paging occasions for the specific type of UE. Accordingly, if the UE is the specific type of UE, the UE may monitor a new paging RNTI (P-RNTI) for the specific type of UE within paging occasion for the specific type of UE. The new P-RNTI may be called P-RNTI2. If the P-RNTI2 is indicated on a PDCCH in UE's paging occasion, the UE may receive the paging message. Paging occasions for the specific type of UE may be a subset of paging occasions used for all other UEs. The eNB may inform paging occasions and paging cycle for the specific type of UE via one of MTC SIBs.

If one or more MTC SIBs are changed in a next modification period or immediately after receiving the paging message, the paging message indicates modification of MTC SIBs. If the received paging message indicates change of MTC SIBs in a modification period, the UE may receive changed MTC SIBs in the next modification period or immediately after receiving the paging message. If the received paging message indicates change of MTC SIBs, the UE may receive MTC SIBs.

At step S210, the UE monitors a PDCCH. When the eNB schedules the MTC SIBs on a DL-SCH at the cell, the eNB indicates an SI-RNTI2, which is for scheduling of the MTC SIBs, on the PDCCH to inform the UE about dynamic scheduling of the MTC SIBs on the DL-SCH.

At step S220, the UE receives an SIB1a. If the cell broadcasts the MTC SIBs, and if the UE is a specific type of UE, the UE may monitor subframes that can broadcast SIB1a. When the PDCCH in a subframe indicates the SI-RNTI2 for scheduling of the MTC SIBs, the UE may consider that the MTC SIBs are scheduled in the subframe. The UE may acquire scheduling information about how other MTC SIBs are scheduled at the cell by receiving the SIB1a.

At step S230, the UE receives other MTC SIBS. The UE may monitor subframes where the other MTC SIBs are scheduled based on the SIB1a. When the PDCCH in the subframe indicates the SI-RNTI2 for scheduling of the MTC SIBs, the UE may consider that the MTC SIBs are scheduled in the subframe. The UE may receive one or more MTC SIBs such as SIB2a and SIB3a.

One or more MTC SIBs described above may contain a public warning system (PWS) notification. One or more MTC SIBs may be SIBs providing Multimedia Broadcast Multicast Services (MBMS) information. One or more MTC SIBs may be SIBs providing Home eNB (HeNB) information.

Figure 11:
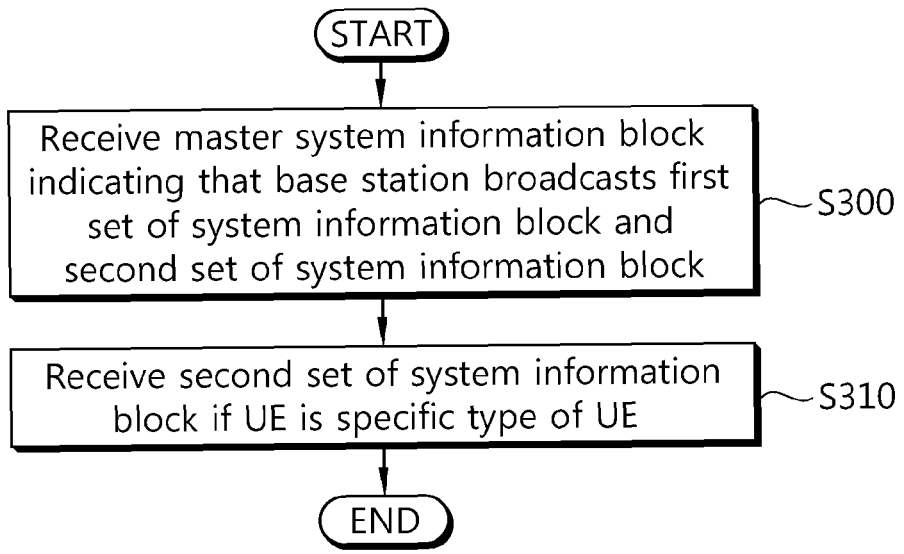
FIG. 11 shows an example of receiving system information according to an embodiment of the present invention.

FIG. 11 shows an example of receiving system information according to an embodiment of the present invention.

At step S300, a UE receives, from a base station, an MIB indicating that the base station broadcasts both a first set of at least one SIB, and a second set of at least one SIB. At step S310, the UE receives the second set of at least one SIB from the base station if the UE is a specific type of UE.

The first set of at least one system information block may be scheduled within a first bandwidth, and the second set of at least one system information block may be scheduled within a second bandwidth, and the second bandwidth is smaller bandwidth than the first bandwidth. In this case, the UE supports the second bandwidth, but does not support the first bandwidth. That is, the specific type of UE to which the UE belongs is not capable of receiving the first set of at least one system information block. Other UEs are capable of receiving the first set of at least one system information block. On the other hand, the specific type of UE to which the UE belongs is capable of receiving the second set of at least one system information block. Other UEs may or may not be capable of receiving the second set of at least one system information block. The second set of at least one system information block may correspond to MTC devices or device-to-device (D2D) communication.

The Receiving the second set of at least one system information block may comprise monitoring a PDCCH including a SI-RNTI for scheduling of the second set of at least one system information block, receiving a first SIB, among the second set of at least one system information block, including scheduling information of the remaining system information blocks of the second set of at least one system information block, and receiving the remaining system information blocks of the second set of at least one system information block.

In addition, for indicating change of the second set of at least one system information block, a paging message may be used. In this case, the paging message is for the specific type of UE. The paging message may be received on paging occasions for the specific type of UE. The paging message for the specific type of UE may be received using a P-RNTI for the specific type of UE.

Figure 12:
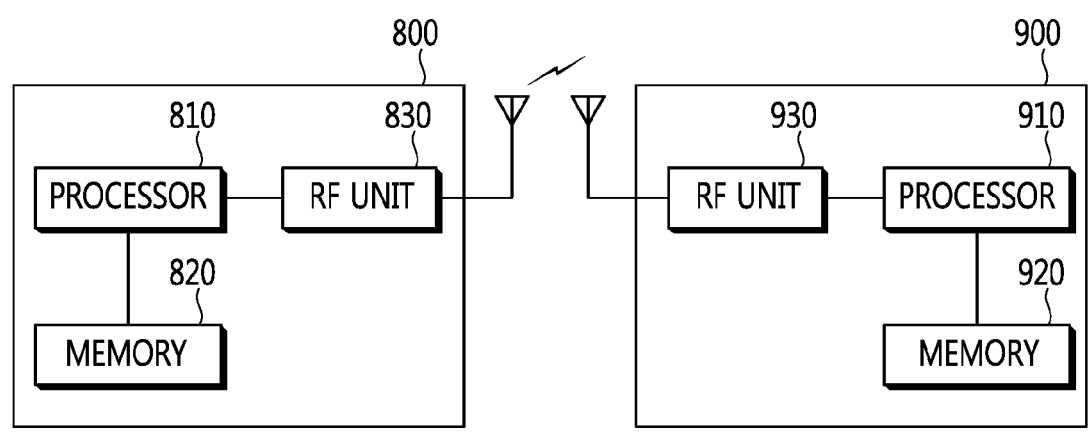
FIG. 12 is a block diagram showing wireless communication system to implement an embodiment of the present invention.

FIG. 12 is a block diagram showing wireless communication system to implement an embodiment of the present invention.

An eNB 800 may include a processor 810, a memory 820 and a radio frequency (RF) unit 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The RF unit 830 is operatively coupled with the processor 810, and transmits and/or receives a radio signal.

A UE 900 may include a processor 910, a memory 920 and a RF unit 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The RF unit 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The RF units 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

The invention claimed is:

1. A method of receiving, by a user equipment (UE), system information in a wireless communication system, the method comprising:
receiving, from a base station, a master information block (MIB) indicating that the base station broadcasts a first system information block type 1 (SIB1) for a specific type of UE;
receiving the first SIB1 for the specific type of UE when the MIB indicates that the base station broadcasts the first SIB1 for the specific type of UE; and
receiving a first set of at least one system information block (SIB) from the base station based on the first SIB1,
wherein the first set of at least one SIB is scheduled within a first bandwidth that is smaller than a second bandwidth for a second set of at least one SIB, wherein, if the specific type of UE is a machine type communication (MTC) device that does not support all or some of the second bandwidth, the UE only supports the first bandwidth, wherein the first set of at least one SIB is related to the first SIB1, wherein the second set of at least one SIB is related to a second SIB1 that is different from the first SIB1, and wherein the first SIB1 includes scheduling information for the first set of at least one SIB for the MTC device.

2. The method of claim 1, wherein the first set of at least one SIB corresponds to device-to-device (D2D) communication.

3. The method of claim 1, wherein the receiving the first set of at least one SIB comprises:
monitoring a physical downlink control channel (PDCCH) including a system information radio network temporary identifier (SI-RNTI) for scheduling of the first set of at least one SIB;
receiving a second SIB, among the first set of at least one SIB, including scheduling information of remaining SIBs of the first set of at least one SIB; and
receiving the remaining SIBs of the first set of at least one SIB.

4. The method of claim 3, wherein the SI-RNTI for scheduling of the first set of at least one SIB indicates whether the first set of at least one SIB is scheduled on a downlink shared channel (DL-SCH).

5. The method of claim 3, further comprising:
receiving a paging message indicating change of the first set of at least one SIB.

6. The method of claim 5, wherein the paging message is for the specific type of UE.

7. The method of claim 5, wherein the paging message is received on paging occasions for the specific type of UE.

8. The method of claim 7, wherein the paging occasions for the specific type of UE are received via the first set of at least one SIB.

9. The method of claim 7, wherein the paging occasions for the specific type of UE belong to a subset of paging occasions of normal UEs.

10. The method of claim 5, further comprising monitoring a PDCCH including a paging RNTI (P-RNTI) for the specific type of UE.

11. The method of claim 1, wherein the second bandwidth is 20 MHz, which is a minimum UE capability that a long term evolution (LTE) UE can support.

12. A user equipment (UE) in a wireless communication system, the UE comprising:
a radio frequency (RF) unit configured to transmit or receive a radio signal; and
a processor coupled to the RF unit,
wherein the processor is configured to:
receive, from a base station, a master information block (MIB) indicating that the base station broadcasts, a first system information block type 1 (SIB1) for a specific type of UE,
receive the first SIB1 for the specific type of UE when the MIB indicates that the base station broadcasts the first SIB1 for the specific type of UE, and
receive a first set of at least one system information block (SIB) from the base station based on the first SIB1,
wherein the first set of at least one SIB is scheduled within a first bandwidth that is smaller than a second bandwidth for a second set of at least one SIB,
wherein, if the specific type of UE is a machine type communication (MTC) device that does not support all or some of the second bandwidth, the UE only supports the first bandwidth,
wherein the first set of at least one SIB is related to the first SIB1,
wherein the second set of at least one SIB is related to a second SIB1 that is different from the first SIB1, and
wherein the first SIB1 includes scheduling information for the first set of at least one SIB for the MTC device.

13. The UE of claim 12, wherein the second bandwidth is 20 MHz, which is a minimum UE capability that a long term evolution (LTE) UE can support.

* * * * *